(12) United States Patent
Shirasaki et al.

(10) Patent No.: US 6,185,040 B1
(45) Date of Patent: *Feb. 6, 2001

(54) VIRTUALLY IMAGED PHASED ARRAY (VIPA) HAVING SPACER ELEMENT AND OPTICAL LENGTH ADJUSTING ELEMENT

(75) Inventors: Masataka Shirasaki, Winchester, MA (US); Simon Cao, San Mateo, CA (US)

(73) Assignees: Fujitsu Limited, Kawasaki (JP); Avanex Corporation, Fremont, CA (US)

(*) Notice: Under 35 U.S.C. 154(b), the term of this patent shall be extended for 0 days.

This patent is subject to a terminal disclaimer.

(21) Appl. No.: 09/352,660

(22) Filed: Jul. 7, 1999

Related U.S. Application Data

(63) Continuation-in-part of application No. 09/140,638, filed on Aug. 26, 1998.

(30) Foreign Application Priority Data

Jul. 26, 1995 (JP) .................................................. 7-190535

(51) Int. Cl.[7] .................................................. G02B 27/00
(52) U.S. Cl. ........................... 359/578; 359/615; 359/629
(58) Field of Search ..................................... 356/346, 352; 359/577, 578, 579, 615, 629, 634, 636, 637, 639, 839, 856, 857, 861

(56) References Cited

U.S. PATENT DOCUMENTS

| | | | |
|---|---|---|---|
| 3,498,693 | 3/1970 | Fein et al. | 356/352 |
| 3,832,030 | 8/1974 | Gloge | 385/33 |
| 3,934,210 | 1/1976 | Yarborough et al. | 372/20 |
| 4,196,396 | 4/1980 | Smith | 359/578 |

(List continued on next page.)

FOREIGN PATENT DOCUMENTS 0026669   5/1930   (AU) .

OTHER PUBLICATIONS

M. Shirasaki, Large Angular–Dispersion By Virtually–Imaged Phased–Array (VIPA) and Its Application to Wavelength Demultiplexing, MOC '95, Hiroshima, Oct. 1995.

M. Shirasaki, Large Angular Dispersion by a Virtually–Imaged Phased Array and its Application to a Wavelength Demultimplexer, Optics Letters, vol. 21, No. 5, Mar. 1996.

M. Shirasaki, Temperature Independent Interferometer For WDM Filters, Paper WeD.1.6 ECOC '96 (European Conference on Optical Communication), Sep. 18, 1996.

(List continued on next page.)

Primary Examiner—Thong Nguyen
Assistant Examiner—John Juba, Jr.
(74) Attorney, Agent, or Firm—Staas & Halsey LLP

(57) ABSTRACT

A virtually imaged phased array (VIPA) which receives an input light at a respective wavelength, and produces a spatially distinguishable output light in accordance with the wavelength of the input light. The VIPA has first and second surfaces. The second surface has a reflectivity which causes a portion of light incident thereon to be transmitted therethrough. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light having any other wavelength within the continuous range of wavelengths. A spacer element has an approximately zero thermal expansion coefficient and maintains the relative positioning between the first and second surfaces to be constant. Preferably, the magnitude of the thermal expansion coefficient of the spacer element is less than or equal to $10^{-5}/°$ C. Even more preferable, the magnitude of the thermal expansion coefficient of the spacer element is less than or equal to $10^{-6}/°$ C.

38 Claims, 15 Drawing Sheets

U.S. PATENT DOCUMENTS

| | | | |
|---|---|---|---|
| 4,362,361 | 12/1982 | Campbell et al. | 359/629 |
| 4,655,547 | 4/1987 | Heritage et al. | 359/563 |
| 4,820,019 | 4/1989 | Yoshida et al. | 359/578 |
| 5,309,456 | 5/1994 | Horton | 372/25 |
| 5,583,683 | 12/1996 | Scobey | 359/127 |
| 5,666,195 | 9/1997 | Shultz et al. | 356/352 |
| 5,684,623 | 11/1997 | King et al. | 372/20 |

OTHER PUBLICATIONS

M. Shirasaki, Filtering Characteristics of Virtually–Imaged Phased Array, Presented at IPR (Integrated Photonics Research) Topical Meeting Paper IMC3, Apr. 29, 1996, Boston, MA.

VIRTUALLY IMAGED PHASED ARRAY (VIPA) HAVING SPACER ELEMENT AND OPTICAL LENGTH ADJUSTING ELEMENT

CROSS-REFERENCE TO RELATED APPLICATIONS

This application is a CIP of U.S. application Ser. No. 09/140,638, filed Aug. 26, 1998, titled "VIRTUALLY IMAGED PHASED ARRAY (VIPA) HAVING SPACER ELEMENT AND OPTICAL LENGTH ADJUSTING ELEMENT," which is incorporated herein by reference.

This application is related to U.S. application Ser. No. 08/685,362, filed Jul. 24, 1996, titled "VIRTUALLY IMAGED PHASED ARRAY AS A WAVELENGTH DEMULTIPLEXER," now U.S. Pat. No. 5,999,320, and which is incorporated herein by reference.

This application is related to U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION," now U.S. Pat. No. 5,930,045, and which is incorporated herein by reference.

This application is related to U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION," now U.S. Pat. No. 5,969,865, and which is incorporated herein by reference.

This application is also related to U.S. application Ser. No. 08/948,945, filed Oct. 10, 1997, titled "APPARATUS WHICH INCLUDES A VIRTUALLY IMAGED PHASED ARRAY (VIPA) IN COMBINATION WITH A WAVELENGTH SPLITTER TO DEMULTIPLEX A WAVELENGTH DIVISION MULTIPLEXED (WDM) LIGHT,", now U.S. Pat. No. 5,973,838, and which is incorporated herein by reference.

This application is related to Japanese patent application number 07-190535, filed Jul. 26, 1995, in Japan, and which is incorporated herein by reference.

BACKGROUND OF THE INVENTION

1. Field of the Invention

The present invention relates to a virtually imaged phased array (VIPA), or "wavelength splitter", which receives a wavelength division multiplexed light comprising a plurality of carriers, and splits the wavelength division multiplexed light into a plurality of luminous fluxes which correspond, respectively, to the plurality of carriers and are spatially distinguishable from each other.

2. Description of the Related Art

Wavelength division multiplexing is used in fiber optic communication systems to transfer a relatively large amount of data at a high speed. More specifically, a plurality of carriers, each modulated with information, is combined into a wavelength division multiplexed light. The wavelength division multiplexed light is then transmitted through a single optical fiber to a receiver. The receiver splits the wavelength division multiplexed light into the individual carriers, so that the individual carriers can be detected. In this manner, a communication system can transfer a relatively large amount of data over an optical fiber.

Therefore, the ability of the receiver to accurately split the wavelength division multiplexed light will greatly effect the performance of the communication system. For example, even if a large number of carriers can be combined into a wavelength division multiplexed light, such a wavelength division multiplexed light should not be transmitted if the receiver cannot accurately split the wavelength division multiplexed light. Accordingly, it is desirable for a receiver to include a high-precision wavelength splitter.

FIG. 1 is a diagram illustrating a conventional filter using a multiple-layer interference film, for use as a wavelength splitter. Referring now to FIG. 1, a multiple-layer interference film 20 is formed on a transparent substrate 22. Light 24, which must be parallel light, is incident on film 20 and then repeatedly reflected in film 20. Optical conditions determined by the characteristics of film 20 allow only a light 26 having wavelength $\lambda 2$ to pass therethrough. A light 28, which includes all light not meeting the optical conditions, does not pass through the film 20 and is reflected. Thus, a filter as illustrated in FIG. 1 is useful for splitting a wavelength division multiplexed light which includes only two carriers at different wavelengths, $\lambda 1$ and $\lambda 2$. Unfortunately, such a filter, by itself, cannot separate a wavelength division multiplexed light having more than two carriers.

FIG. 2 is a diagram illustrating a conventional Fabry-Perot interferometer for use as a wavelength splitter. Referring now to FIG. 2, high-reflectance reflecting films 30 and 32 are parallel to each other. Light 34, which must be parallel light, is incident on reflecting film 30 and reflected many times between reflecting films 30 and 32. Light 36 of wavelength $\lambda 2$ that meets passage conditions determined by the characteristics of the Fabry-Perot interferometer passes through reflecting film 32. Light 38 of wavelength $\lambda 1$, which does not meet the passage conditions, is reflected. In this manner, light having two different wavelengths can be split into two different lights corresponding, respectively, to the two different wavelengths. Thus, as with the filter illustrated in FIG. 1, a conventional Fabry-Perot interferometer is useful for splitting a wavelength division multiplexed light which includes only two carriers at different wavelengths, $\lambda 1$ and $\lambda 2$. Unfortunately, such a Fabry-Perot interferometer cannot separate a wavelength division multiplexed light having more than two carriers.

FIG. 3 is a diagram illustrating a conventional Michelson interferometer for use as a wavelength splitter. Referring now to FIG. 3, parallel light 40 is incident on a half mirror 42 and split into a first light 44 and a second light 46 perpendicular to each other. A reflecting mirror 48 reflects first light 44 and a reflecting mirror 50 reflects second light 46. The distance between half mirror 42 and reflecting mirror 48, and the distance between half mirror 42 and reflecting mirror 50 indicate an optical path difference. Light reflected by reflecting mirror 48 is returned to half mirror 42 and interferes with light reflected by reflecting mirror 50 and returned to half mirror 42. As a result, lights 52 and 54 having wavelengths $\lambda 1$ and $\lambda 2$, respectively, are separated from each other. As with the filter illustrated in FIG. 1 and the Fabry-Perot interferometer illustrated in FIG. 2, the Michelson interferometer illustrated in FIG. 3 is useful for splitting a wavelength division multiplexed light which includes only two carriers at different wavelengths, $\lambda 1$ and $\lambda 2$. Unfortunately, such a Michelson interferometer cannot separate a wavelength division multiplexed light having more than two carriers.

It is possible to combine several filters, Fabry-Perot interferometers or Michelson interferometers into a giant array so that additional wavelength carriers can be split from a single wavelength division multiplexed light. However, such an array is expensive, inefficient and creates an undesirably large receiver.

A diffraction grating or an array waveguide grating is often used to split a wavelength division multiplexed light comprising two or more different wavelength carriers.

FIG. 4 is a diagram illustrating a conventional diffraction grating for splitting a wavelength division multiplexed light. Referring now to FIG. 4, a diffraction grating 56 has a concavo-convex surface 58. Parallel light 60 having a plurality of different wavelength carriers is incident on concavo-convex surface 58. Each wavelength carrier is reflected and interferes among the reflected lights from different steps of the grating. As a result, carriers 62, 64 and 66 having different wavelengths are output from diffraction grating 56 at different angles, and are therefore separated from each other.

Unfortunately, a diffraction grating outputs the different wavelength carriers with relatively small difference of angle. Therefore, the angular dispersion produced by the diffraction grating will be extremely small. As a result, it is difficult for a receiver to accurately receive the various carrier signals split by the diffraction grating. This problem is especially severe with a diffraction grating which splits a wavelength division multiplexed light having a large number of carriers with relatively close wavelengths.

In addition, a diffraction grating is influenced by the optical polarization of the incident light. Therefore, the polarization of the incident light can affect the performance of the diffraction grating. Also, the concavo-convex surface of a diffraction grating requires complex manufacturing processes to produce an accurate diffraction grating.

FIG. 5 is a diagram illustrating a conventional array waveguide grating for splitting a wavelength division multiplexed light. Referring now to FIG. 5, light comprising a plurality of different wavelength carriers is received through an entrance 68 and is divided through a number of waveguides 70. An optical exit 72 is at the end of each waveguide 70, so that an output light 74 is produced. Waveguides 70 are different in length from each other, and therefore provide optical paths of different lengths. Therefore, lights passing through waveguides 70 have different path lengths from each other and thereby interfere with each other through exit 72 to form output 74 in different directions for different wavelengths.

In an array waveguide grating, the angular dispersion can be adjusted to some extent by properly configuring the waveguides. However, an array waveguide grating is influenced by temperature changes and other environmental factors. Therefore, temperature changes and environmental factors make it difficult to properly adjust the performance.

SUMMARY OF THE INVENTION

Accordingly, it is an object of the present invention to provide a wavelength splitter having a simple configuration and being capable of simultaneously separating a plurality of carriers from a wavelength division multiplexed light.

It is an additional object of the present invention to provide a wavelength splitter which disperses separated carriers at a relatively large angular dispersion, and is resistant to changes in environmental conditions.

Objects of the present invention are achieved by providing an apparatus receiving an input light at a respective wavelength within a continuous range of wavelengths. The apparatus includes an angular dispersive device having first and second surfaces. The second surface has a reflectivity which causes a portion of light incident thereon to be transmitted therethrough. The first and second surfaces are positioned so that the input light is reflected a plurality of times between the first and second surfaces to cause a plurality of lights to be transmitted through the second surface. The plurality of transmitted lights interfere with each other to produce an output light which is spatially distinguishable from an output light produced for an input light at any other wavelength within the continuous range of wavelengths. A spacer element maintains the relative positioning between the first and second surfaces to be constant, and preferably has a thermal expansion coefficient which is approximately zero. To provide an approximately zero thermal expansion coefficient, the magnitude of the thermal expansion coefficient of the spacer element preferably is less than or equal to $10^{-5}/°$ C. Even more preferable, the magnitude of the thermal expansion coefficient of the spacer element is less than or equal to $10^{-6}/°$ C.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
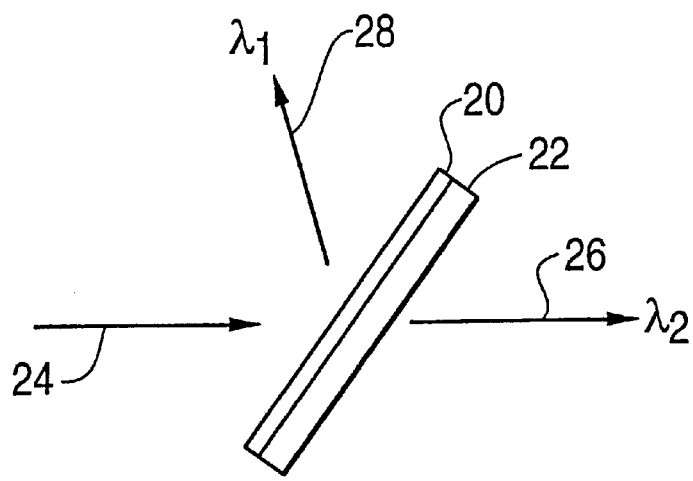
FIG. 1 (prior art) is a diagram illustrating a conventional filter using a multiple-layer interference film.
Figure 2:
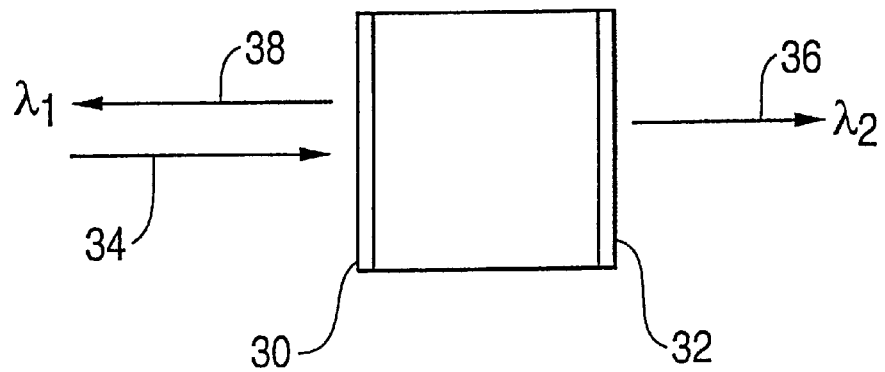
FIG. 2 (prior art) is a diagram illustrating a conventional Fabry-Perot interferometer.
Figure 3:
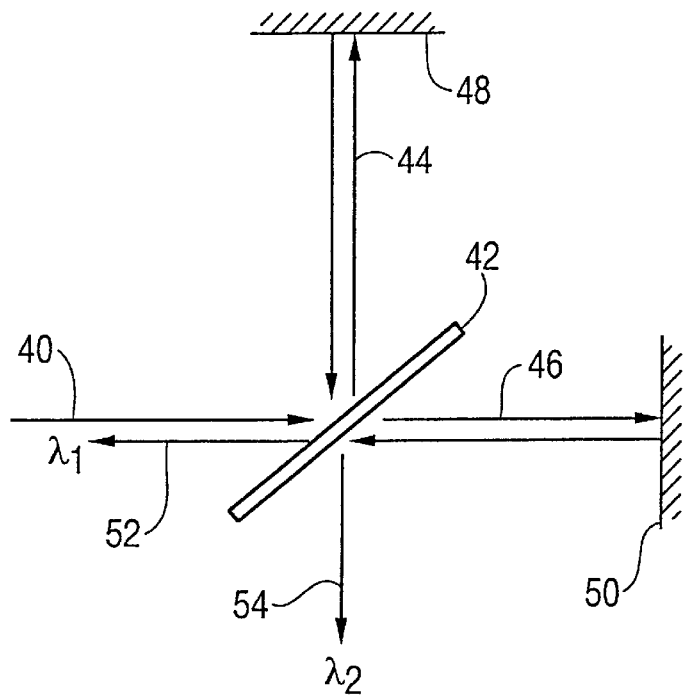
FIG. 3 (prior art) is a diagram illustrating a conventional Michelson interferometer.
Figure 4:
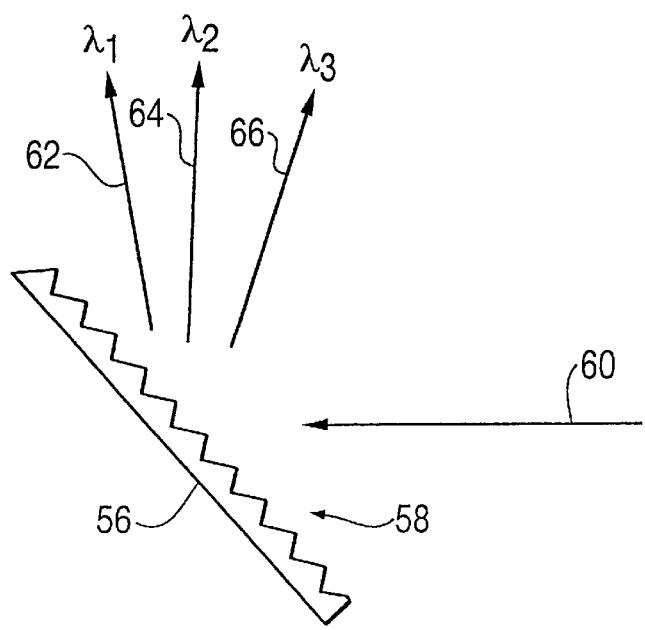
FIG. 4 (prior art) is a diagram illustrating a conventional diffraction grating.
Figure 5:
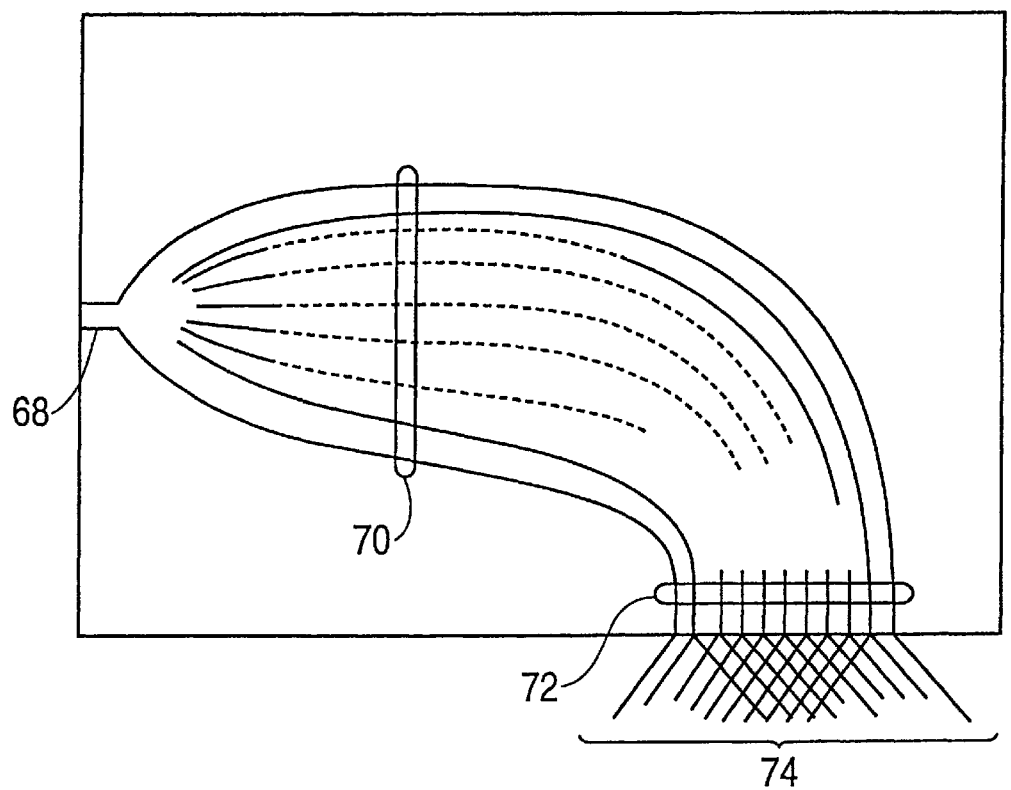
FIG. 5 (prior art) is a diagram illustrating a conventional array waveguide grating for splitting a wavelength division multiplexed light.

Reference will now be made in detail to the present preferred embodiments of the present invention, examples of which are illustrated in the accompanying drawings, wherein like reference numerals refer to like elements throughout.

Figure 6:
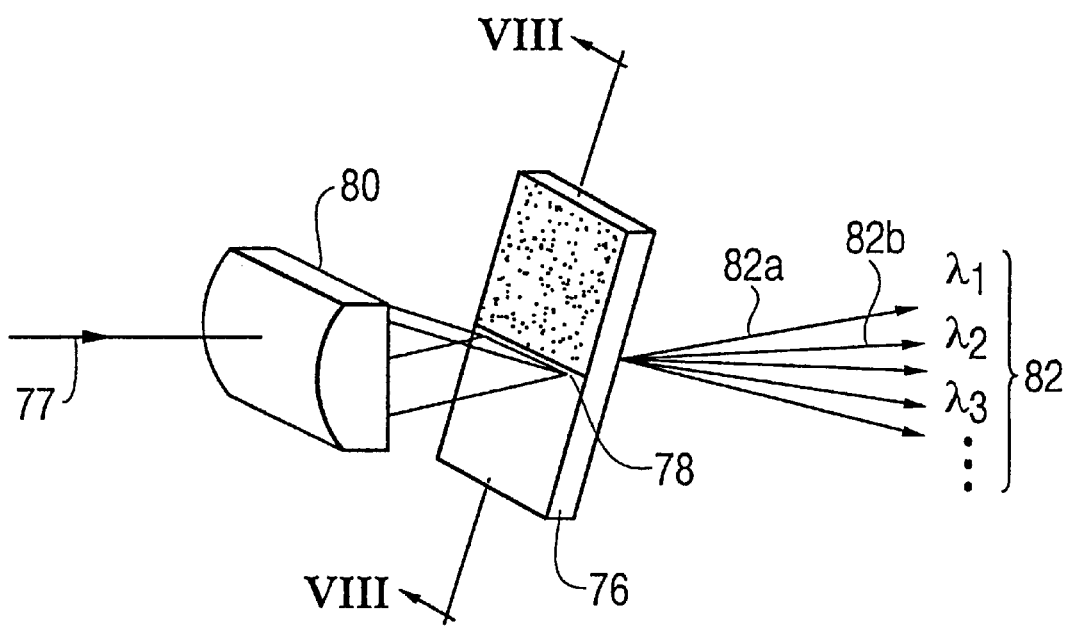
FIG. 6 is a diagram illustrating a virtually imaged phased array (VIPA), according to an embodiment of the present invention.

FIG. 6 is a diagram illustrating a virtually imaged phased array (VIPA), according to an embodiment of the present invention. Moreover, hereinafter, the terms "wavelength splitter", "virtually imaged phased array" and "VIPA" can be used interchangeably to describe various embodiments of the present invention.

Referring now to FIG. 6, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 inside VIPA 76. VIPA 76 then outputs a luminous flux 82 of collimated light, where the output angle of luminous flux 82 varies as the wavelength of input light 77 changes. For example, when input light 77 is at a wavelength λ1, VIPA 76 outputs a luminous flux 82a at wavelength λ1 in a specific direction. When input light 77 is at a wavelength λ2, VIPA 76 outputs a luminous flux 82b at wavelength λ2 in a different direction. Therefore, VIPA 76 produces luminous fluxes 82a and 82b which are spatially distinguishable from each other. If input light 77 includes both wavelengths λ1 and λ2, then VIPA 76 will simultaneously output both luminous fluxes 82a and 82b.

Figure 7:
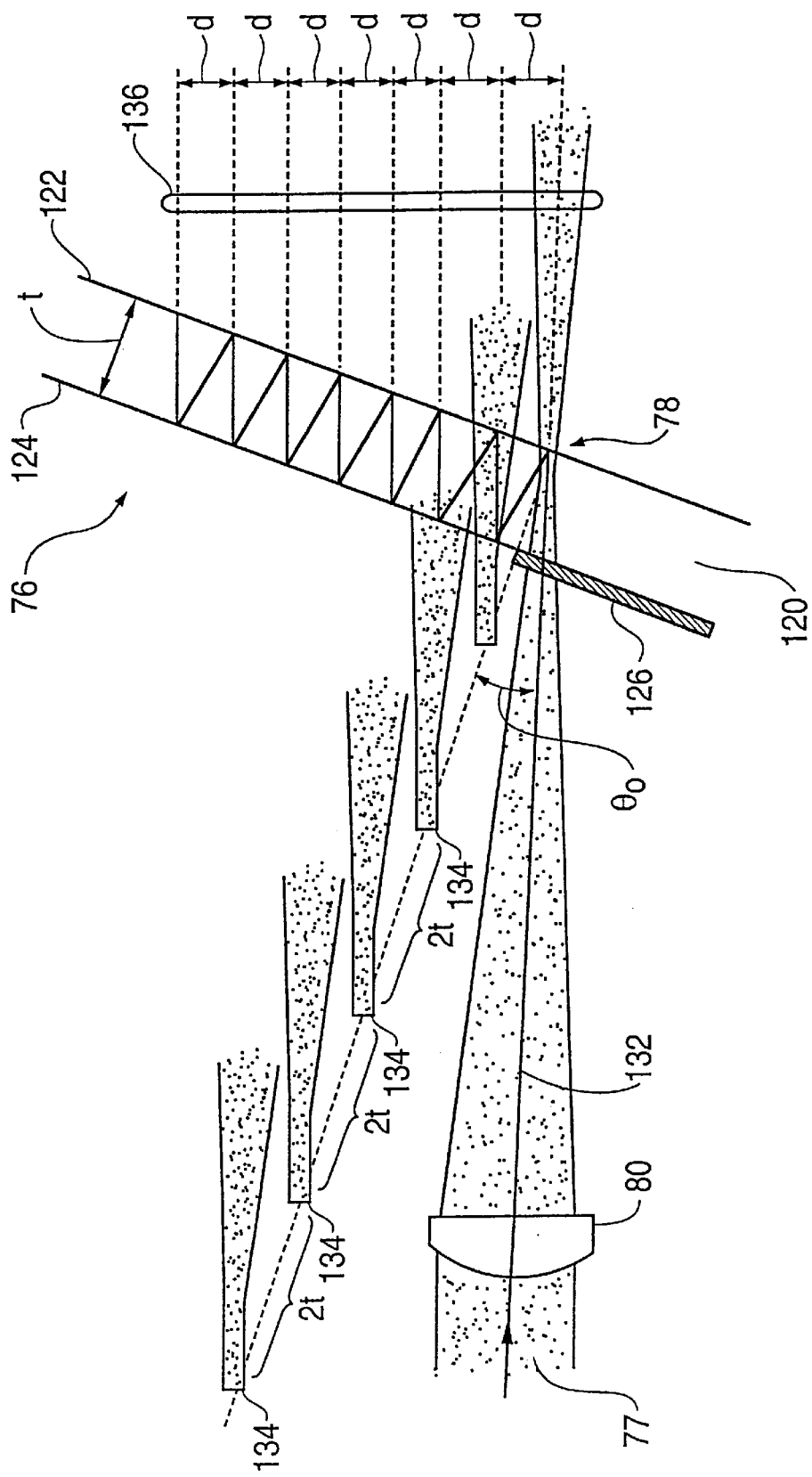
FIG. 7 is a detailed diagram illustrating the VIPA of FIG. 6, according to an embodiment of the present invention.

FIG. 7 is a detailed diagram illustrating VIPA 76, according to an embodiment of the present invention. Referring now to FIG. 7, VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0%.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated in FIG. 7 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of input light 77 as it travels through radiation window 126 (for example, the area "a" illustrated in FIG. 10, discussed in more detail further below), and (ii) the area of light on reflecting film 124 when input light 77 is reflected for the first time by reflecting film 124 (for example, the area "b" illustrated in FIG. 10, discussed in more detail further below). It is desirable to reduce such overlap to ensure proper operation of the VIPA.

In FIG. 7, an optical axis 132 of input light 77 has a small tilt angle $\theta_0$. Assuming the reflectivity of reflecting film 122 is 95%, upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 7, the light is split into many paths with a constant separation d. The beam shape in each path forms so that the light diverges from virtual images 134 of the beam waist. Virtual images 134 are located with constant spacing 2t along a line that is normal to plate 120, where t is the thickness of plate 120. The positions of the beam waists in virtual images 134 are self-aligned, and there is no need to adjust individual positions. The lights diverging from virtual images 134 interfere with each other and form collimated light 136 which propagates in a direction that changes in accordance with the wavelength of input light 77.

The spacing of light paths is $d=2t \sin \theta_0$, and the difference in the path lengths between adjacent beams is $2t \cos \theta_0$. The angular dispersion is proportional to the ratio of these two numbers, which is $\cot \theta_0$. As a result, a VIPA produces a significantly large angular dispersion.

As easily seen from FIG. 7, the term "virtually imaged phased array" arises from the formation of an array of virtual images 134.

Figure 8:
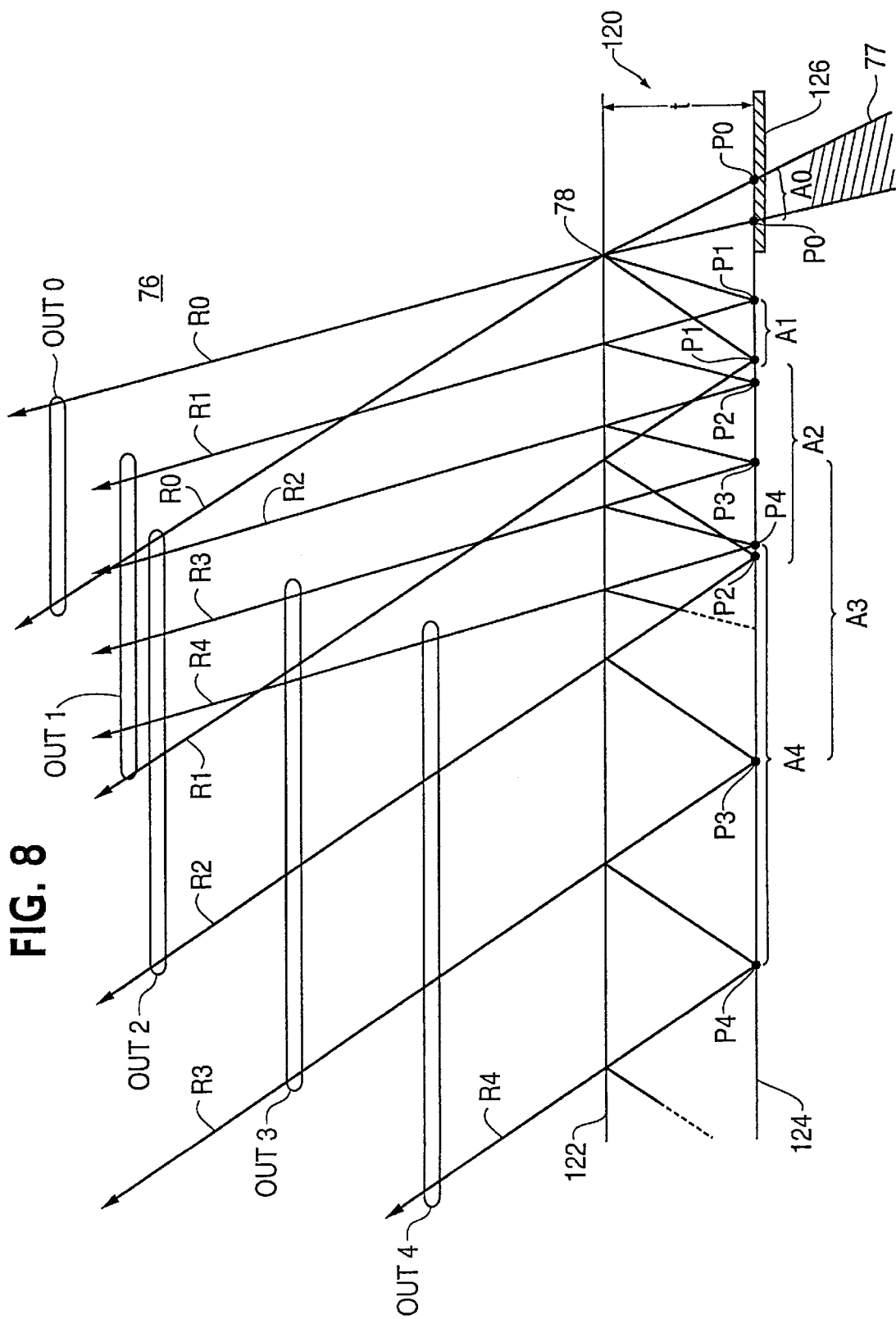
FIG. 8 is a diagram illustrating a cross-section along lines VIII—VIII of the VIPA illustrated in FIG. 6, according to embodiment of the present invention.

FIG. 8 is a diagram illustrating a cross-section along lines VIII—VIII of VIPA 76 illustrated in FIG. 6, according to embodiment of the present invention. Referring now to FIG. 8, plate 120 has reflecting surfaces 122 and 124 thereon. Reflecting surfaces 122 and 124 are in parallel with each other and spaced by the thickness t of plate 120. Reflecting surfaces 122 and 124 are typically reflecting films deposited on plate 120. As previously described, reflecting surface 124 has a reflectance of approximately 100%, except in radiation window 126, and reflecting surface 122 has a reflectance of approximately 95% or higher. Therefore, reflecting surface 122 has a transmittance of approximately 5% or less so that approximately 5% or less of light incident on reflecting surface 122 will be transmitted therethrough and approximately 95% or more of the light will be reflected. The reflectances of reflecting surfaces 122 and 124 can easily be changed in accordance with the specific VIPA application. However, generally, reflecting surface 122 should have a reflectance which is less than 100% so that a portion of incident light can be transmitted therethrough.

Reflecting surface 124 has radiation window 126 thereon. Radiation window 126 allows light to pass therethrough, and preferably has no reflectance, or a very low reflectance. Radiation window 126 receives input light 77 to allow input light 77 to be received between, and reflected between, reflecting surfaces 122 and 124.

Since FIG. 8 represents a cross-section along lines VIII—VIII in FIG. 6, focal line 78 in FIG. 6 appears as a "point" in FIG. 8. Input light 77 then propagates radially from focal line 78. Moreover, as illustrated in FIG. 8, focal line 78 is positioned on reflecting surface 122. Although it is not required for focal line 78 to be on reflecting surface 122, a shift in the positioning of focal line 78 may cause small changes in the characteristics of VIPA 76.

As illustrated in FIG. 8, input light 77 enters plate 120 through an area A0 in radiation window 126, where points P0 indicate peripheral points of area A0.

Due to the reflectivity of reflecting surface 122, approximately 95% or more of input light 77 is reflected by reflecting surface 122 and is incident on area A1 of reflecting surface 124. Points P1 indicate peripheral points of area A1. After reflecting off area A1 on reflecting surface 124, input light 77 travels to reflecting surface 122 and is partially transmitted through reflecting surface 122 as output light Out1 defined by rays R1. In this manner, as illustrated in FIG. 8, input light 77 experiences multiple reflections between reflecting surfaces 122 and 124, wherein each reflection off of reflecting surface 122 also results in a respective output light being transmitted therethrough. Therefore, for example, input light 77 reflects off of areas A2, A3 and A4 to produce output lights Out2, Out3 and Out4. Points P2 indicate peripheral points of area A2, points P3 indicate peripheral points of area A3, and points P4 indicate peripheral points of area A4. Output light Out2 is defined by rays R2, output light Out3 is defined by rays R3 and output light Out4 is defined by rays R4. Although FIG. 8 only illustrates output lights Out0, Out1, Out2, Out3 and Out4, there will actually be many more output lights, depending on the power on input light 77 and the reflectances of reflecting surfaces 122 and 124. As will be discussed in more detail further below, the output lights interfere with each other to produce a luminous flux having a direction which changes in accordance with the wavelength of input light 77.

Figure 9:
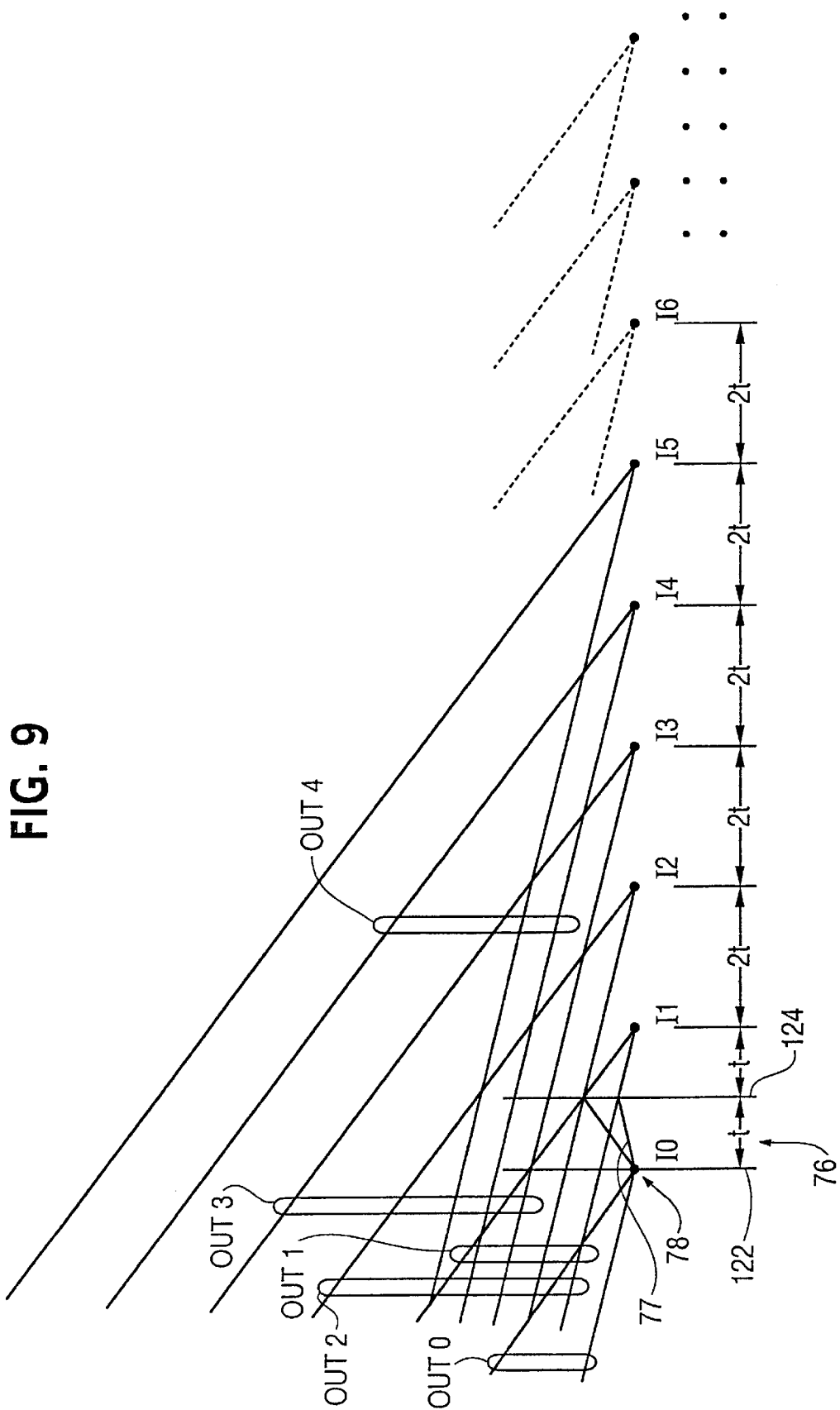
FIG. 9 is a diagram illustrating interference produced by a VIPA, according to an embodiment of the present invention.

FIG. 9 is a diagram illustrating interference produced by a VIPA, according to an embodiment of the present invention. Referring now to FIG. 9, light travelling from focal line 78 is reflected by reflecting surface 124. As previously described, reflecting surface 124 has a reflectance of approximately 100% and, therefore, functions essentially as a mirror. As a result, output light Out1 can be optically analyzed as if reflecting surfaces 122 and 124 did not exist and, instead, output light Out1 was emitted from a focal line $I_1$. Similarly, output lights Out2, Out3 and Out4 can be optically analyzed as if they were emitted from focal lines $I_2$, $I_3$ and $I_4$, respectively. The focal lines $I_1$, $I_2$, $I_3$ and $I_4$ are virtual images of a focal line $I_0$.

Therefore, as illustrated in FIG. 9, focal line $I_1$ is a distance 2t from focal line $I_0$, where t equals the distance between reflecting surfaces 122 and 124. Similarly, each subsequent focal line is a distance 2t from the immediately preceding focal line. Thus, focal line $I_2$ is a distance 2t from focal line $I_1$. Moreover, each subsequent multiple reflection between reflecting surfaces 122 and 124 produces an output light which is weaker in intensity than the previous output light. Therefore, output light Out2 is weaker in intensity than output light Out1.

As illustrated in FIG. 9, output lights from the focal lines overlap and interfere with each other. This interference produces a luminous flux which travels in a specific direction depending on the wavelength of input light 77.

A VIPA according to the above embodiments of the present invention has strengthening conditions which are characteristics of the design of the VIPA. The strengthening conditions increase the interference of the output lights so that a luminous flux is formed. The strengthening conditions of the VIPA are represented by the following Equation (1):

$$2t \times \cos\theta = m\lambda$$

where θ indicates the propagation direction of the resulting luminous flux as measured from a line perpendicular to the surface of reflecting surfaces 122 and 124, λ indicates the wavelength of the input light, t indicates the distance between the reflecting surfaces 122 and 124, and m indicates an integer.

Therefore, if t is constant and m is assigned a specific value, then the propagation direction θ of the luminous flux formed for input light having wavelength λ can be determined.

More specifically, input light 77 is radially dispersed from focal line 78 through a specific angle. Therefore, input light having the same wavelength will be travelling in many different direction from focal line 78, to be reflected between reflecting surfaces 122 and 124. The strengthening conditions of the VIPA cause light travelling in a specific direction to be strengthened through interference of the output lights to form a luminous flux having a direction corresponding to the wavelength of the input light. Light travelling in different direction than the specific direction required by the strengthening condition will be weakened by the interference of the output lights.

Figure 10:
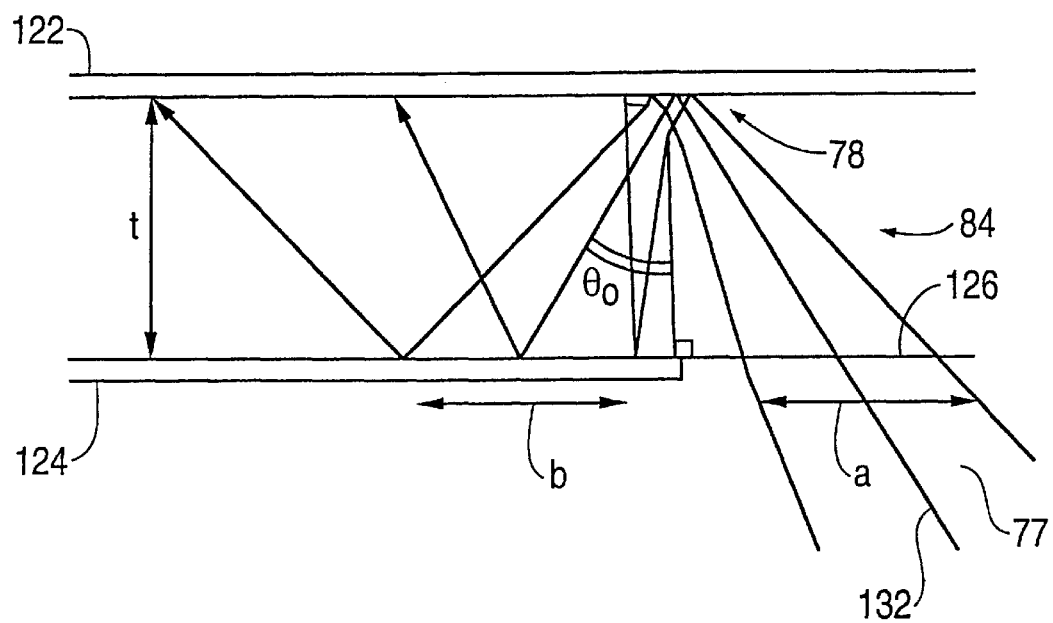
FIG. 10 is a diagram illustrating a cross-section along lines VIII—VIII of the VIPA illustrated in FIG. 6, for determining the tilt angle of input light, according to an embodiment of the present invention.

FIG. 10 is a diagram illustrating a cross-section along lines VIII—VIII of the VIPA illustrated in FIG. 6, showing characteristics of a VIPA for determining the angle of incidence, or tilt angle, of input light, according to an embodiment of the present invention.

Referring now to FIG. 10, input light 77 is collected by a cylindrical lens (not illustrated) and focused at focal line 78. As illustrated in FIG. 10, input light 77 covers an area having a width equal to "a" on radiation window 126. After input light 77 is reflected one time from reflecting surface 122, input light 77 is incident on reflecting surface 124 and covers an area having a width equal to "b" on reflecting surface 124. Moreover, as illustrated in FIG. 10, input light 77 travels along optical axis 132 which is at a tilt angle $\theta_0$ with respect to the normal to reflecting surface 122.

The tilt angle $\theta_0$ should be set to prevent input light 77 from travelling out of radiation window 126 after being reflected the first time by reflecting surface 122. In other words, the tilt angle $\theta_0$ should be set so that input light 77 remains "trapped" between reflecting surfaces 122 and 124 and does not escape through radiation window 126. Therefore, to prevent input light 77 from travelling out of radiation window 126, the tilt angle $\theta_0$ should be set in accordance with the following Equation (2):

$$\text{tilt of optical axis } \theta_0 > (a+b)/4t$$

The term (a+b) becomes minimum when a=b, which is the situation that focal line 78 is located on reflecting surface 122.

Therefore, as illustrated by FIGS. 6–10, embodiments of the present invention include a VIPA which receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 8 illustrates an input light 77 which experiences multiple reflection between reflecting surfaces 122 and 124. This multiple reflection produces a plurality of output lights Out0, Out1, Out2, Out3 and Out4 which interfere with each other to produce a spatially distinguishable luminous flux for each wavelength of input light 77.

"Self-interference" is a term indicating that interference occurs between a plurality of lights or beams which all originate from the same source. Therefore, the interference of output lights Out0, Out1, Out2, Out3 and Out4 is referred to as self-interference of input light 77, since output lights Out0, Out1, Out2, Out3 and Out4 all originate from the same source (that is, input light 77).

According to the above embodiments of the present invention, an input light can be at any wavelength within a continuous range of wavelengths. Thus, the input light is not limited to being a wavelength which is a value chosen from a range of discrete values.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 6, the travelling direction (that is, a "spatial characteristic") of the luminous flux 82 is different when input light 77 is at different wavelengths within a continuous range of wavelengths. Moreover, referring to FIG. 6, for example, if input light 77 included all three wavelengths $\lambda 1$, $\lambda 2$ and $\lambda 3$, then luminous fluxes 82a, 82b and 82c would be simultaneously produced, each travelling in a different direction.

According to the above embodiments of the present invention, a focal line is described as being on the opposite surface of a parallel plate from which input light enters. However, the focal line can be, for example, in the parallel plate, on the surface of the radiation window, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

According to the above embodiments of the present invention, a waveguide device is described as being formed by a parallel plate, or by two reflecting surfaces in parallel with each other. However, the plate or reflecting surfaces do not necessarily have to be parallel.

According to the above embodiments of the present invention, a VIPA uses multiple-reflection and maintains a constant phase difference between interfering lights.

As a result, the characteristics of the VIPA are stable, thereby reducing optical characteristic changes causes by polarization. By contrast, the optical characteristics of a conventional diffraction grating experience undesirable changes in dependance on the polarization of the input light.

The above embodiments of the present invention are described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are other ways in which luminous fluxes can be spatially distinguished from each other.

Figure 11:
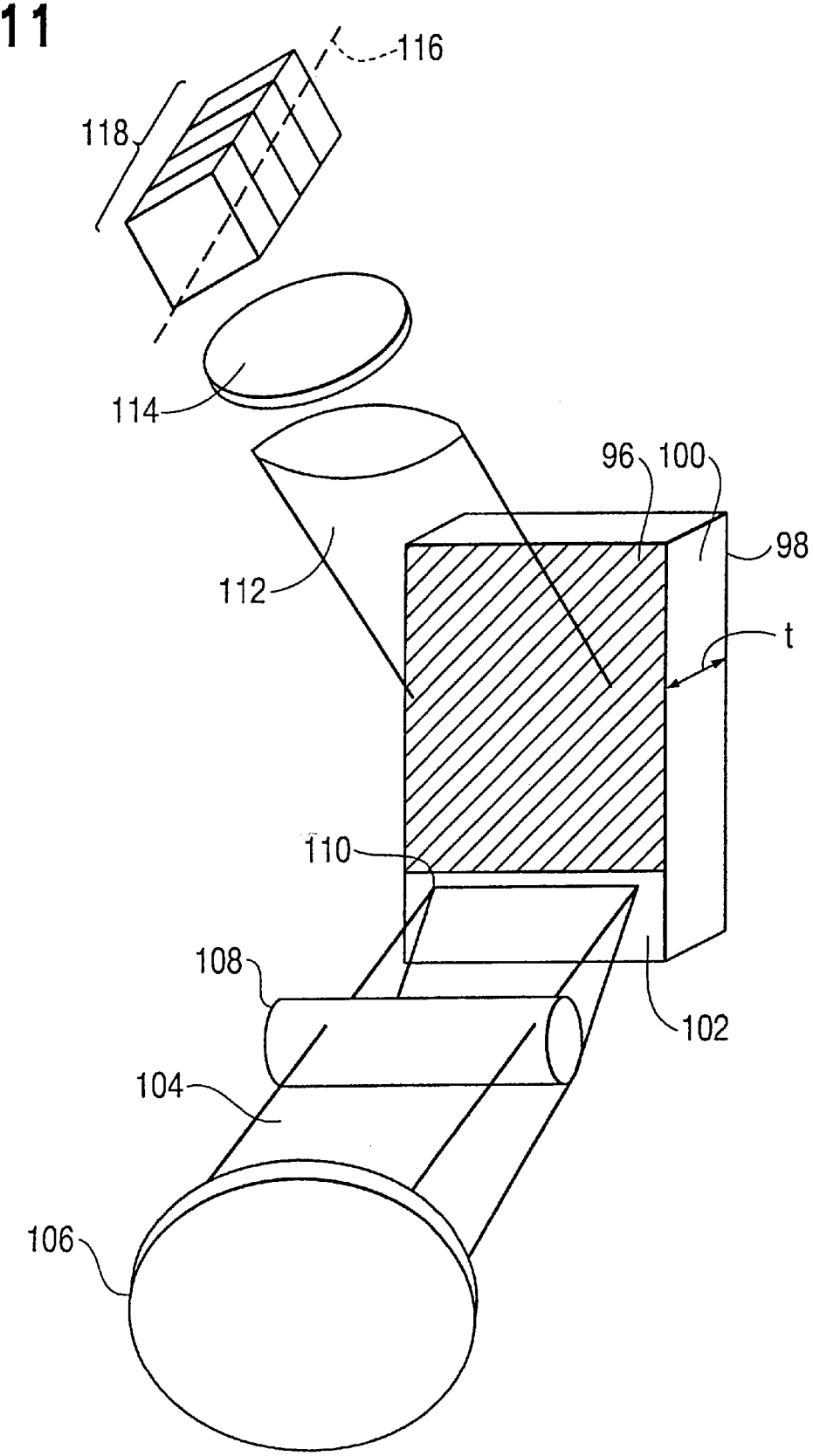
FIG. 11 is a diagram illustrating a VIPA as used with a receiver, according to an embodiment of the present invention.

FIG. 11 is a diagram illustrating a VIPA as used with a receiver, according to an embodiment of the present invention. Referring now to FIG. 11, multiple-layer reflecting films 96 and 98 are applied on both sides of a parallel plate 100 made of glass having a thickness, t, of, for example, 10 $\mu$m. It is preferable for parallel plate 100 to have a thickness in the range of 20 to 2000 $\mu$m. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different value as long as enough light is reflected from reflecting film 96 to allow for multiple reflections between reflecting films 96 and 98. Preferably, the reflectance of reflecting film 96 is in the range of 80% to a few percentages less than 100%. Moreover, the reflectance of reflecting film 98 is not limited to 100%, but should be high enough to allow multiple reflections between reflecting films 96 and 98.

A radiation window 102 receives input light and is positioned on parallel plate 100 on the same surface as reflecting film 96. Radiation window 102 can be formed by a film having approximately 0% reflectance on the surface of parallel plate 100. As illustrated in FIG. 11, the boundary between radiation window 102 and reflecting film 96 is preferably a straight line.

The input light is output from, for example, an optical fiber (not illustrated) and received by a collimating lens 106. Collimating lens 106 converts the input light into parallel beams 104 which are received by a cylindrical lens 108. Cylindrical lens 108 focuses parallel beams 104 into a focal line 110 on radiation window 102. Focal line 110 is positioned close to and parallel with the straight line boundary between reflecting film 96 and radiation window 102. In this manner, input light enters parallel plate 100 via radiation window 102.

The optical axis of input light 102 is at a tilt angle with respect to the normal to reflecting film 96 so that input light will not escape through radiation window 102 after entering parallel plate 100. Thus, the tilt angle is set in accordance with Equation (2), above.

Once inside parallel plate 100, the input light experiences multiple reflection between reflecting films 96 and 98 (as illustrated, for example, in FIG. 8). Each time the input light is incident on reflecting film 96, approximately 95% of the light is reflected towards reflecting film 98 and approximately 5% of the light passes through reflecting film 96 to form an output light (such as, for example, output light Out1 illustrated in FIG. 8). Multiple reflections between reflecting films 96 and 98 cause a plurality of output lights to be formed. The plurality of output lights interfere with each other to form a luminous flux 112 having a propagation direction which depends on the wavelength of the input light.

Luminous flux 112 is then collected by a lens 114, which focuses luminous flux 112 at a collection point. The collection point moves along a straight line path 116 for different wavelengths of the input light. For example, as the wavelength of the input light increases, the collection point is moved farther along straight line path 116. A plurality of receivers 118 are arranged on straight line path 116 to receive the focused luminous flux 112. Therefore, each receiver 118 can be positioned to receive a luminous flux corresponding to a specific wavelength.

By controlling the distance t between the reflecting films or reflecting surfaces of the VIPA, the phase difference of light reflected between the reflecting films or reflecting surfaces and can be shifted by a predetermined amount, thereby realizing excellent environmental resistance. Moreover, the above embodiments of the present invention experience only a small change in optical characteristics depending on the optical polarization.

Figure 12:
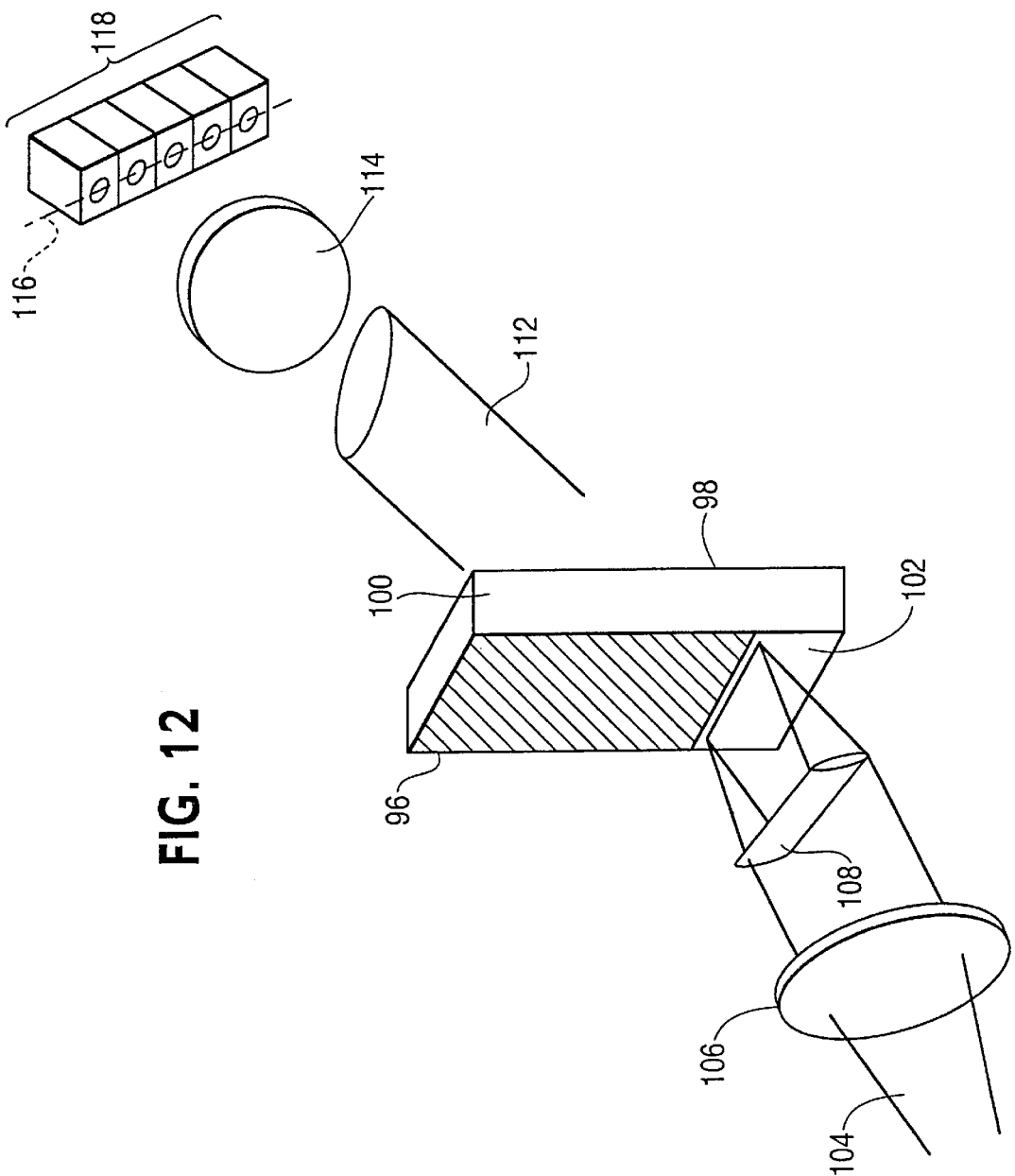
FIG. 12 is a diagram illustrating a VIPA as used with a receiver, according to an additional embodiment of the present invention.

FIG. 12 is a diagram illustrating a VIPA as used with a receiver, according to an additional embodiment of the present invention. The VIPA illustrated in FIG. 12 is similar to the VIPA illustrated in FIG. 11, except that the reflectances of reflecting films 96 and 98 are reversed. More specifically, in the VIPA illustrated in FIG. 12, reflecting film 98 has a reflectance of approximately 95% and reflecting film 96 has a reflectance of approximately 100%. As illustrated in FIG. 12, luminous flux 112 is formed through interference of output light travelling through reflecting film 98. Thus, the input light enters one side of parallel plate 100, and luminous flux 112 is formed on the opposite side of parallel plate 100. Otherwise, the VIPA illustrated in FIG. 12 operates in a similar manner as the VIPA illustrated in FIG. 11.

Figure 13:
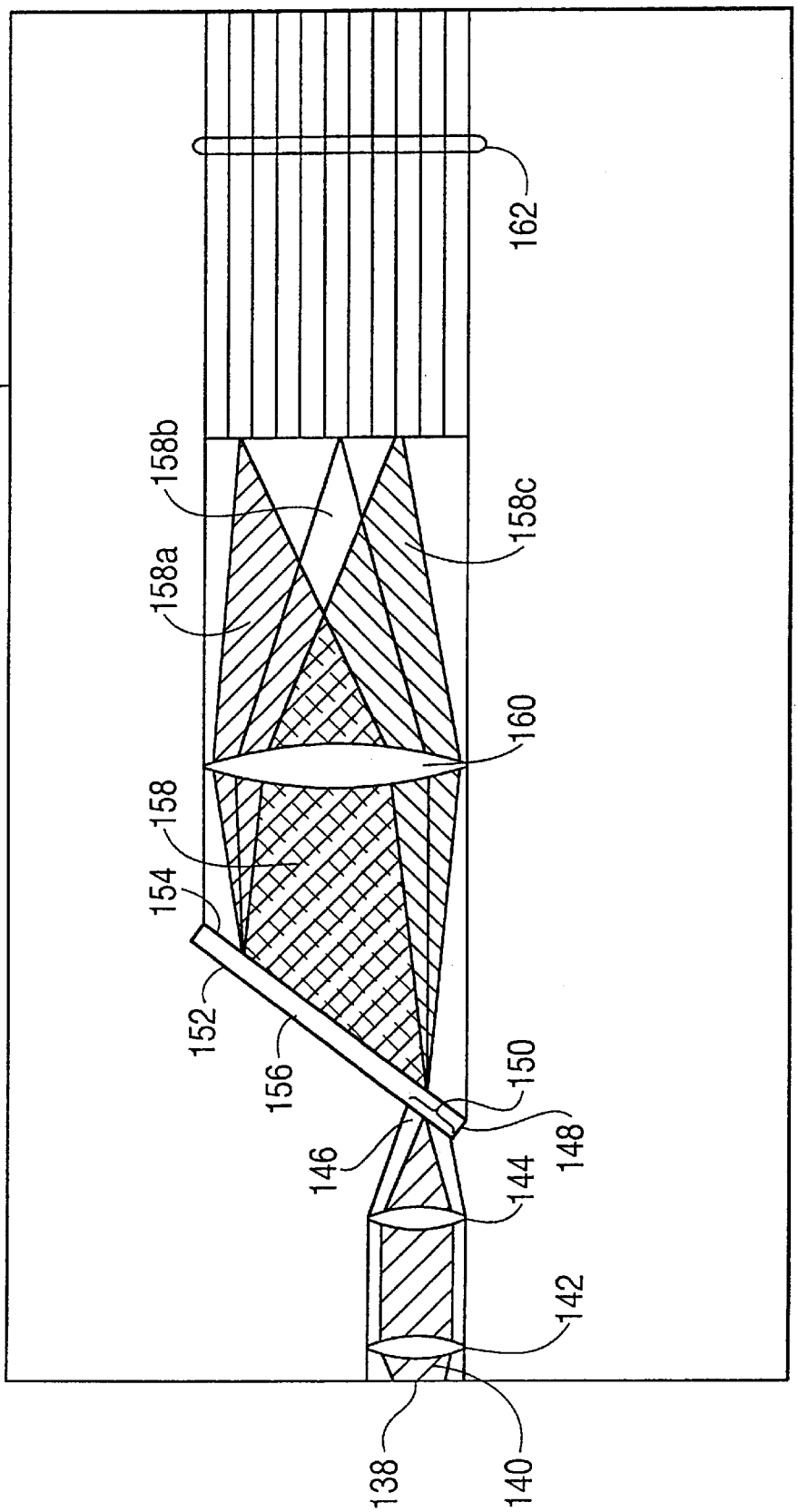
FIG. 13 is a diagram illustrating a waveguide type VIPA, according to an embodiment of the present invention.

FIG. 13 is a diagram illustrating a waveguide type VIPA, according to an embodiment of the present invention. Referring now to FIG. 13, light 138 is output from an optical fiber (not illustrated) and received by a waveguide 140 provided on a substrate 142. Waveguide 140 is, for example, lithium niobate. Light 138 contains optical signals modulated on a plurality of carriers having different wavelengths.

Light 138 typically has a dispersed width as it is output from the optical fiber. Therefore, a collimating lens 142 converts light 138 into parallel light. The parallel light is then collected by a cylindrical lens 144 and focused into a focal line 146. The light then radiates into a VIPA 148 from focal line 146 through a radiation window 150.

VIPA 148 comprises reflecting films 152 and 154 on a parallel plate 156. Reflecting film 154 is on one side of a parallel plate 156, and reflecting film 152 and radiation window 150 are on the other side of parallel plate 156. Reflecting film 152 has a reflectance of approximately 100%, and reflecting film 154 has a reflectance of less than 100%. A luminous flux 158 of light reflected by parallel plate 156 is output to the side of parallel plate 156 opposite to radiation window 150.

If input light 138 includes a plurality of wavelengths, a plurality of luminous fluxes 158 will be formed which travel in different directions depending of the wavelengths of input light 138. Luminous flux 158 formed by VIPA 148 is focused by a lens 160 at different points, depending on the propagation direction of luminous flux 158. Therefore, as illustrated in FIG. 13, luminous fluxes 158a, 158b and 158c having wavelengths λ1, λ2, and λ3, respectively, are formed at different collection points.

A plurality of receiving waveguides 162 are provided at the collection points. Each receiving waveguide 162 guides an optical signal and corresponding carrier having a single wavelength. Therefore, a plurality of luminous fluxes can be simultaneously received and transmitted through various channels. Each receiving waveguide 162 has a corresponding receiver (not illustrated) provided at a later stage. The receiver is typically a photodiode. Therefore, light guided by each receiving waveguides 162 is processed after being detected by the corresponding receiver.

When a VIPA is manufactured, the reflecting surfaces should be maintained in a precise, parallel position, and the effective distances (which are the optical distances, or physical distances multiplied by the index of the media) between the surfaces must be accurately adjusted.

Figure 14:
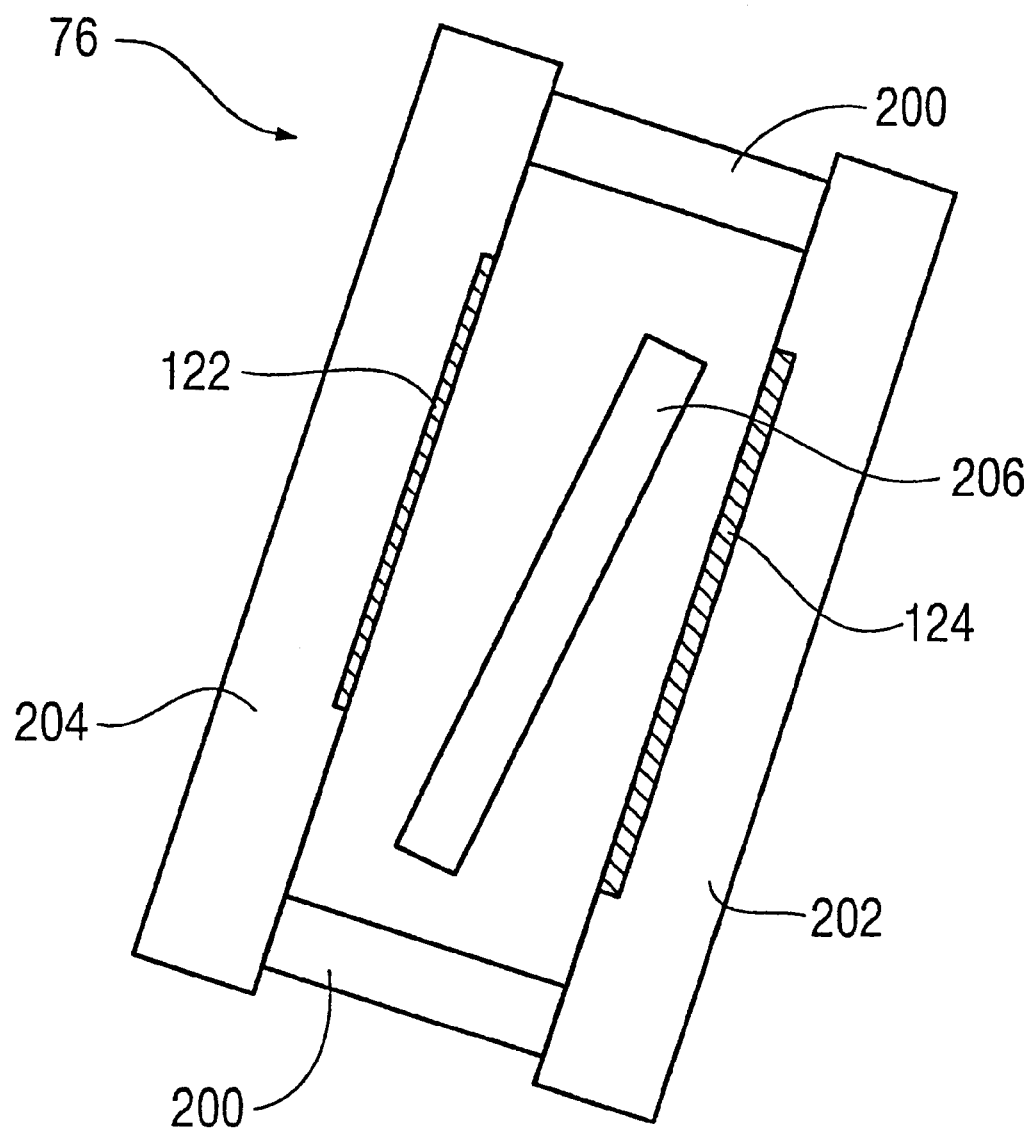
FIG. 14 is a diagram illustrating a VIPA having spacer elements and a cavity length adjusting element, according to a further embodiment of the present invention.

Therefore, FIG. 14 is a diagram illustrating a VIPA according to a further embodiment of the present invention. Referring now to FIG. 14, spacer elements 200 are preferably made of a material having approximately zero thermal expansion coefficient, and maintain reflecting films 122 and 124 to be a specific distance apart from each other in parallel. To provide an approximately zero thermal expansion coefficient, as an example, the magnitude of the thermal expansion coefficient of spacer elements 200 preferably is less than or equal to $10^{-5}/°$ C. Even more preferable, the magnitude of the thermal expansion coefficient of spacer elements 200 is less than or equal to $10^{-6}/°$ C. Suitable materials with these properties for use as spacer elements 200 include Vycor® and ULE® glasses manufactured by Corning, Inc. of Corning, N.Y., USA, and Zerodur® glass manufactured by Schott Glass Technologies, Inc., of Duryea, Pa., USA. These materials have expected thermal expansion coefficients of $7.5\times10^{-7}/$,C., $<3.0\times10^{-8}/°$ C. and $<1.0\times10^{-7}/°$ C., respectively. However, spacer elements 200 are not limited to being made of a glass material, and other materials which provide the required thermal expansion coefficient may be appropriate.

Thus, the cavity distance will not change as the temperature changes.

In FIG. 14, VIPA 76 is shown as having transparent blocks 202 and 204 with reflecting films 122 and 124 formed thereon. Transparent blocks 202 and 204 are not intended to be limited to a "block" shape, and can instead have any suitable shape.

Spacer elements 200 contact transparent blocks 202 and 204. Spacer elements 200 are not intended to be limited to any specific shape. Preferably, no adhesive is used to attach spacer elements 200 to transparent blocks 202 and 204, as an adhesive typically has a corresponding thermal expansion.

Virtually any number of spacer elements 200 can be used, and the present invention is not intended to be limited to any specific number of spacer elements.

Moreover, a cavity length adjusting element 206 is inserted between reflecting films 122 and 124. Preferably, cavity length adjusting element 206 is a thin plate made of transparent material. When cavity length adjusting element 206 is made of, for example, athermal glass, the optical phase of the transmission light will not change as the temperature changes. The optical distance in the cavity between reflecting films 122 and 124 can be accurately adjusted by tilting cavity length adjusting element 206.

In a typical application, the material between reflecting surfaces 122 and 124 will simply be "air". Moreover, cavity length adjusting element 206 preferably has a different refractive index than the air, or such other material which is between reflecting films 122 and 124. As a result, the optical distance between reflecting films 122 and 124 will change by moving (such as, for example, by tilting or rotating) cavity length adjusting element 206. Thus, cavity length adjusting element 206 can be adjusted to thereby adjust the optical distance between reflecting films 122 and 124.

Cavity length adjusting element 206 is preferably a thin plate having an antireflection coating on both sides, so that there is no reflection on either side.

Therefore, the optical distance from one reflecting film 122 or 124, through the air or other material between the reflecting films, through cavity length adjusting element 206, to the other reflecting film, will be the same along the entire length of cavity length adjusting element 206. However, the optical distance between reflecting films 122 and 124 can be adjusted by changing the angle of cavity length adjusting element 206.

Cavity length adjusting element 206 stays inside VIPA 76 after manufacture, and is held in place. Many different types of holding mechanisms can be used to hold cavity length adjusting element 206, as long as the holding mechanism allows cavity length adjusting element 206 to be appropriately moved, rotated, or tilted, to provide the required effect.

For example, a metal bar (not illustrated) can be used to hold cavity length adjusting element 206 in place.

Moreover, the optical distance through cavity length adjusting element 206 should be temperature insensitive. Athermal glass provides temperature insensitivity and can be used as cavity length adjusting element 206. However, other materials may also be satisfactory, and the present invention is not intended to be limited to the use of athermal glass.

Cavity length adjusting element 206 is not intended to be limited for use in a VIPA. Thus, cavity length adjusting element 206 can be used in other optical elements, such as, for example, a Fabry-Perot interferometer.

In FIG. 14, transparent blocks 202 and 204 have reflecting films 122 and 124 formed thereon. Thus, transparent blocks 202 and 204 are part of VIPA 76, and spacer elements 200 contact transparent blocks 202 and 204. However, transparent blocks 202 and 204 may not be necessary in certain applications, and the present invention is not intended to be limited to the use of such transparent blocks. Moreover, spacer elements 200 can be positioned to contact reflecting films 122 and 124.

Figure 15:
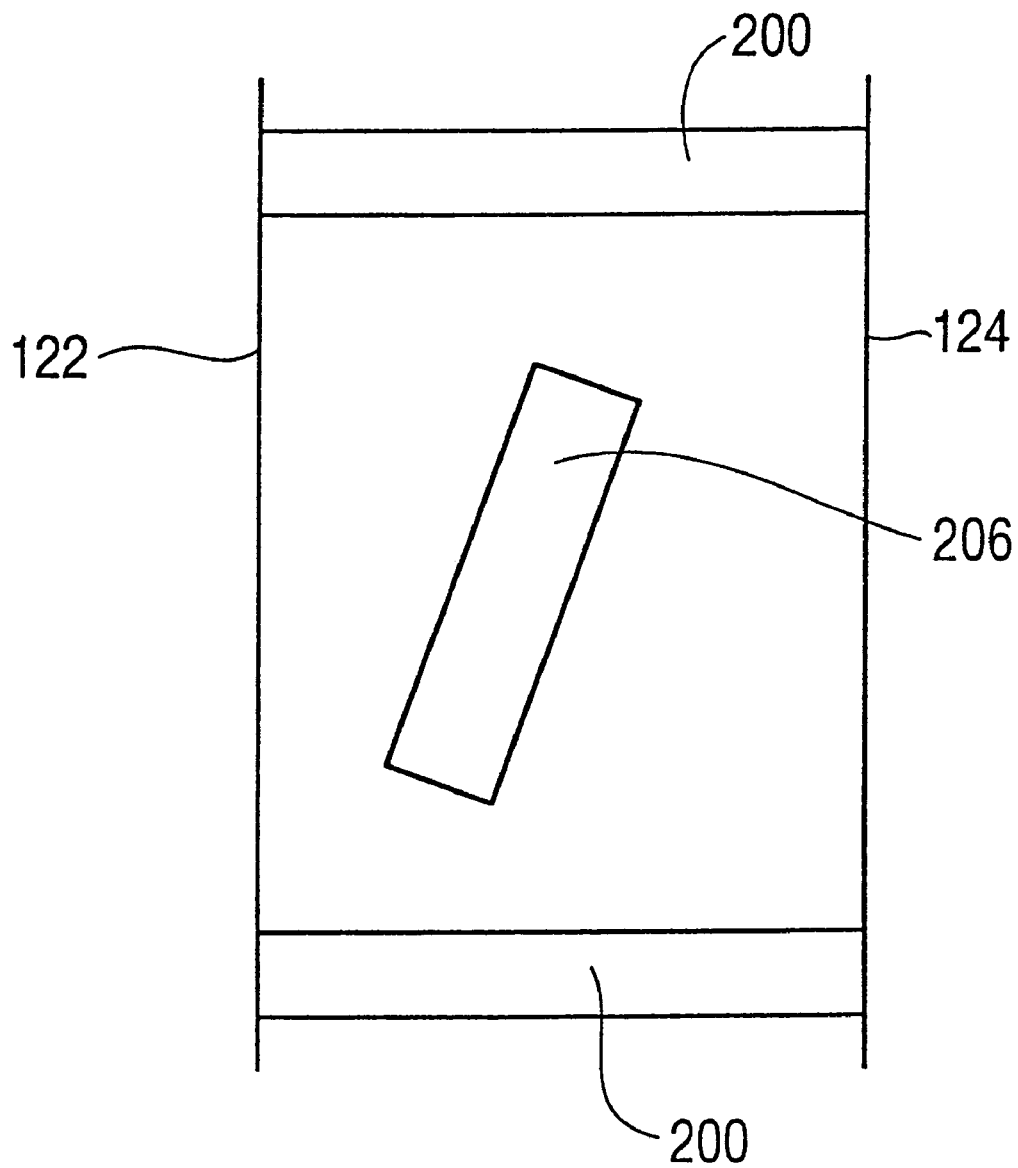
FIG. 15 is a diagram illustrating a VIPA having spacer elements and a cavity length adjusting element, according to an additional embodiment of the present invention.

For example, FIG. 15 is a diagram illustrating a VIPA having spacer elements 200 contacting reflecting films 122 and 124, according to an embodiment of the present invention.

The above embodiments of the present invention can also be used with an apparatus which uses a VIPA to produce, or compensate for, chromatic dispersion.

Figure 16:
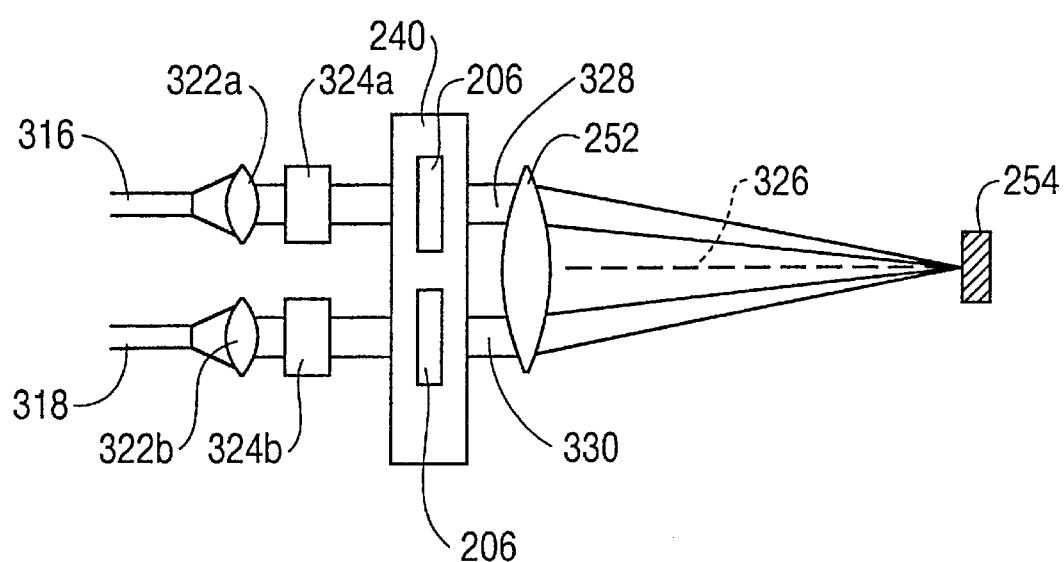
FIG. 16 is a diagram illustrating a top view of an apparatus using a VIPA to produce, or compensate for, chromatic dispersion, and which has a cavity length adjusting element, according to an embodiment of the present invention.

For example, FIG. 16 is a diagram illustrating a top view of an apparatus using a VIPA to produce, or compensate for, chromatic dispersion, and which has a cavity length adjusting element, according to an embodiment of the present invention.

Referring now to FIG. 16, a collimating lens 322a and a semi-cylindrical lens 324a are positioned between an input fiber 316 and a VIPA 240. Input light travels from input fiber 316 and is formed into a collimated light by collimating lens 322a. This collimated light is then line focused by semi-cylindrical lens 324a into the radiation window of VIPA 240. A resulting luminous flux produced by VIPA 240 travels to a focusing lens 252 and is focused onto a mirror 254, to be reflected by mirror 254. In FIG. 16, focusing lens 252 is a "normal" focusing lens, where "normal" focusing lens refers to a focusing lens which focuses light as seen from both a top view and a side view of the focusing lens, and has the same focal length in the top and side views.

A collimating lens 322b and a semi-cylindrical lens 324b are positioned between an output fiber 318 and VIPA 240. The light reflected by mirror 254 back to VIPA 240 undergoes multiple reflection inside VIPA 240 and is output through the radiation window of VIPA 240. This output light from VIPA 240 travels to semi-cylindrical lens 324b and collimating lens 322b, to be focused into output fiber 318.

As illustrated in FIG. 16, the light which is focused on mirror 254 is not perpendicular to mirror 254 in the top view. This occurs since focusing lens 252 is placed so that the luminous flux produced by VIPA 240 does not pass through the center of focusing lens 252 in the top view. Similarly, the light reflected by mirror 254 does not pass through the center of focusing lens 252. Preferably, the lens center of focusing lens 252 is displaced from the beam center of the luminous flux produced by VIPA 240 and the beam center of the light reflected by mirror 254 by at least half the beam thickness in the top view. As a result, focusing lens 252 focuses light on mirror 254 at the position of the extended lens axis 326 of focusing lens 252. Further, light 328 travelling from VIPA 240 to focusing lens 252 will be parallel to light 330 travelling from focusing lens 252 to VIPA 240 for any wavelength.

With the apparatus illustrated in FIG. 16, the input light from input fiber 316 travels in a different space than the output light to be received by output fiber 318. Thus, the output light can be coupled to a fiber which is different from the input fiber. Moreover, the apparatus has a relatively high performance since the input light received into the radiation window of VIPA 240 travels in a perpendicular direction to VIPA 240, as seen in a top view.

With the apparatus illustrated in FIG. 16, the light received by output fiber 318 will have chromatic dispersion added thereto, with respect to the input light from input fiber 316. Thus, the apparatus in FIG. 16 can be used to produce, or compensate for, chromatic dispersion.

Cavity length adjusting elements 206 are inside VIPA 240. Preferably, there is a separate cavity length adjusting element 206 for the incoming and outgoing beams, as illustrated in FIG. 16, so that the optical distance between the reflecting surfaces of VIPA 240 can be independently adjusted for the incoming and outgoing beams. However, a single cavity length adjusting element can be used. Such a single cavity length adjusting element can be designed to affect only one of the incoming and outgoing beams, or both of the beams. Further, the material between the reflecting surfaces of VIPA 240 can be air, with cavity length elements 206 held in place therein.

While FIG. 16 illustrates two separate semi-cylindrical lenses 324a and 324b, a single semi-cylindrical lens can be used. For example, FIG. 17 is a diagram illustrating a single semi-cylindrical lens 324 used instead of plural semi-cylindrical lenses 324a and 324b, according to an embodiment of the present invention.

Generally, a semi-cylindrical lens is defined as a lens which focuses light in one of a top view of a side view, and has no focusing effect in the other view. Semi-cylindrical lenses are well-known.

In addition, the present invention is not intended to be limited to the use of collimating lenses, semi-cylindrical lenses and/or any other specific type of lens. Instead, many other lenses or devices can be used as long as the appropriate effect is provided.

Figure 17:
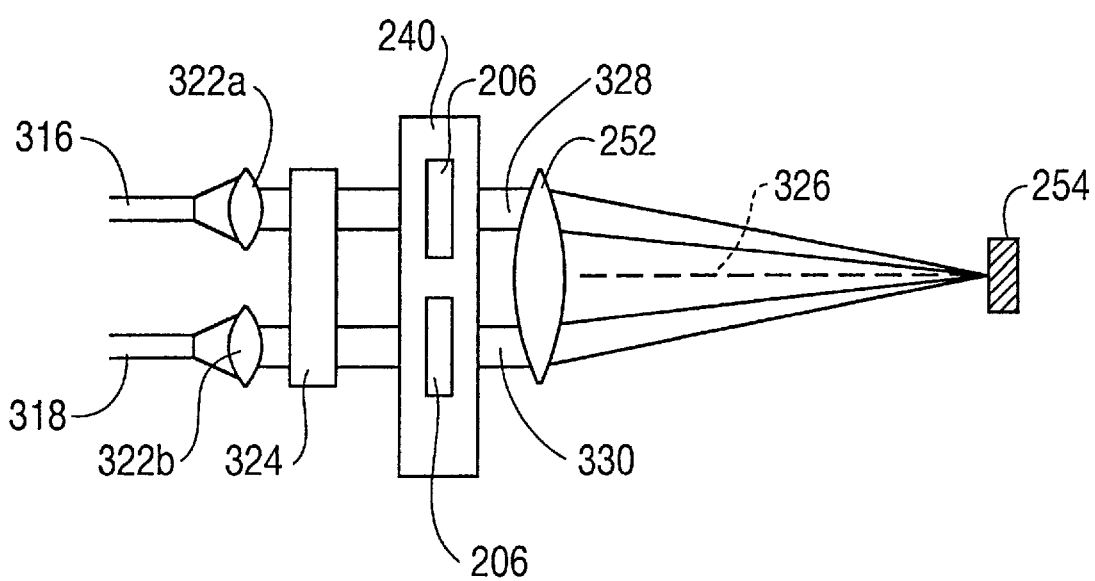
FIG. 17 is a diagram illustrating a single collimating lens for an apparatus using a VIPA and a spacer element to produce, or compensate for, chromatic dispersion, according to an embodiment of the present invention.

Therefore, according to embodiments of the present invention as illustrated, for example, in FIGS. 16 and 17, an apparatus includes a VIPA which receives an input light and produces a corresponding output light propagating away from the VIPA. A light returning device, such as a mirror, receives the output light from the VIPA and then returns the output light back to the VIPA. A lens is positioned so that (a) the output light travels from the VIPA to the light returning device by travelling from the VIPA to the lens and then being focused by the lens to the light returning device, (b) the output light returns from the light returning device to the VIPA by travelling from the light returning device to the lens and then being directed by the lens to the VIPA, and (c) the output light travelling from the VIPA to the lens is perpendicular to the VIPA in the top view, and the returned output light travelling from the lens to the VIPA is perpendicular to the VIPA in the top view. Further, a cavity length adjusting element is provided inside the VIPA to change the optical distance between the reflecting surfaces of the VIPA for either or both of the light traveling to the light returning device, and the light returned to the VIPA from the light returning device.

VIPA 240 in FIGS. 16 and 17 can also include spacer elements, such as, for example, spacer elements 200 in FIG. 14.

According to the above embodiments of the present invention, a VIPA is described as being formed by a parallel plate, or by two reflecting surfaces in parallel with each other. However, the plate or reflecting surfaces do not necessarily have to be parallel.

According to the above embodiments of the present invention, a light which includes a plurality of wavelengths can be simultaneously divided. Therefore, a receiver for use in wavelength multiplexing communications can be successfully reduced in size.

According to the above embodiments of the present invention, a VIPA can simultaneously split a wavelength multiplexed light for each wavelength of input light. Moreover, the angle of dispersion can be adjusted by the thickness t of the parallel plate forming the VIPA. As a result, the angle of dispersion can be made large enough to allow a receiver to easily receive each split signal. For example, a conventional diffraction grating requires a fine concavo-convex surface for a large angle of dispersion. However, it is very difficult to prepare a fine and precise concavo-convex surface, thereby limiting the size of the angle of dispersion. By contrast, a VIPA according to the above embodiments of the present invention only requires a change in thickness of the parallel plate to realize a relatively large angle of dispersion.

Moreover, a VIPA according to the above embodiments of the present invention produces a larger angle of dispersion than a conventional diffraction grating. Therefore, a receiver which uses a VIPA according to the above embodiments of the present invention can correctly receive an optical signal, without fail, even in wavelength multiplexing communications realizing high-level multiplexing processes. Furthermore, such a receiver has a relatively simple construction and is relatively inexpensive to produce.

According to the above embodiments of the present invention, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

Moreover, as compared to an array waveguide grating, a VIPA according to the above embodiments of the present invention requires a relatively simple configuration and achieves stable optical characteristics and resistance to changes in environmental conditions.

In the above embodiments of the present invention, a VIPA has reflecting films to reflect light. For example, FIG. 7 illustrates a VIPA 76 having reflecting films 122 and 124 to reflect light. However, it is not intended for a VIPA to be limited to the use of "film" to provide a reflecting surface. Instead, the VIPA must simply have appropriate reflecting surfaces, and these reflecting surfaces may or may not be formed by "film".

Further, in the above embodiments of the present invention, a VIPA includes a transparent glass plate in which multiple reflection occurs. For example, FIG. 7 illustrates a VIPA 76 having a transparent glass plate 120 with reflecting surfaces thereon. However, it is not intended for a VIPA to be limited to the use of a glass material, or any type of "plate", to separate the reflecting surfaces. Instead, the reflecting surfaces must simply be separated from each other. For example, the reflecting surfaces of a VIPA can simply have "air" therebetween, instead of a glass plate, with the reflecting surfaces stably sustained by a material such as glass or metal with low thermal expansion. Therefore, the reflecting surfaces can be described as having a transparent material therebetween which is, for example, optical glass or air.

A VIPA according to the above embodiments of the present invention is not intended to be limited to use a wavelength splitter. For example, a VIPA can be used to compensate for, or produce, chromatic dispersion, as disclosed in U.S. application Ser. No. 08/796,842, filed Feb. 7, 1997, titled "OPTICAL APPARATUS WHICH USES A VIRTUALLY IMAGED PHASED ARRAY TO PRODUCE CHROMATIC DISPERSION", and U.S. application Ser. No. 08/910,251, filed Aug. 13, 1997, titled "OPTICAL APPARATUS WHICH USES A VIRTUALLY IMAGED PHASED ARRAY TO PRODUCE CHROMATIC DISPERSION", and which are incorporated herein by reference.

Although a few preferred embodiments of the present invention have been shown and described, it would be appreciated by those skilled in the art that changes may be made in these embodiments without departing from the principles and spirit of the invention, the scope of which is defied in the claims and their equivalents.

What is claimed is:

1. An apparatus receiving an input light at a respective wavelength within a continuous range of wavelengths, the apparatus comprising:

an angular dispersive device having first and second surfaces, the second surface having a reflectivity which causes a portion of light incident thereon to be transmitted therethrough, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light at any other wavelength within the continuous range of wavelengths; and a spacer element maintaining the relative positioning between the first and second surfaces to be constant, the spacer element having a thermal expansion coefficient with a magnitude which is less than or equal to $10^{-5}/°$ C.

2. An apparatus as in claim 1, wherein the spacer element has a thermal expansion coefficient with a magnitude which is less than or equal to $10^{-6}/°$ C.

3. An apparatus as in claim 1, wherein the spacer element is made of a material comprising glass.

4. An apparatus as in claim 1, wherein the first and second surfaces are parallel to each other, and the spacer element maintains the first and second surfaces to be in parallel through temperature changes.

5. An apparatus as in claim 1, wherein the first and second surfaces are separated by a specific distance, and the spacer element maintains the specific distance to be constant.

6. An apparatus as in claim 1, wherein the spacer element contacts the first and second surfaces.

7. An apparatus as in claim 1, further comprising:

a plurality of spacer elements maintaining the relative positioning between the first and second surfaces to be constant.

8. An apparatus as in claim 1, further comprising:

an adjusting element positioned between the first and second surfaces and being adjustable to change the optical distance between the first and second surfaces.

9. An apparatus as in claim 8, wherein the adjusting element is made of a transparent material.

10. An apparatus as in claim 8, wherein the adjusting element is made of transparent material and has first and second sides, the first side being adjacent to the first surface of the angular dispersive device and the second side being adjacent to the second surface of the angular dispersive device, the first and second sides of the adjusting element being coated with an anti-reflection coating.

11. An apparatus as in claim 10, wherein the adjusting element is a plate.

12. An apparatus as in claim 10, wherein the adjusting element is rotatable to change the optical distance.

13. An apparatus as in claim 8, wherein the adjusting element is rotatable to change the optical distance.

14. An apparatus as in claim 8, the apparatus having a top view and further comprising:
   a light returning device which receives the output light from the angular dispersive device and returns the output light to the angular dispersive device to be reflected between the first and second surfaces; and
   a lens positioned so that
      the output light travels from the angular dispersive device to the light returning device by travelling from the angular dispersive device to the lens and then being focused by the lens to the light returning device,
      the output light returns from the light returning device to the angular dispersive device by travelling from the light returning device to the lens and then being directed by the lens to the angular dispersive device, and
      the output light travelling from the angular dispersive device to the lens is perpendicular to the angular dispersive device in the top view, and the returned output light travelling from the lens to the angular dispersive device is perpendicular to the angular dispersive device in the top view.

15. An apparatus as in claim 1, wherein the first surface has a reflectivity of approximately 100%.

16. An apparatus as in claim 1, wherein the input light is a wavelength division multiplexed light comprising at least two carriers which each are at a different wavelength within the continuous range of wavelengths, and the plurality of transmitted lights interfere with each other to produce a respective output light for each carrier of the input light, each output light being spatially distinguishable from the other output lights.

17. An apparatus receiving an input light at a respective wavelength and focused into a line, the apparatus comprising:
   an angular dispersive device including first and second surfaces, the second surface having a reflectivity which causes a portion of light incident thereon to be transmitted therethrough, the first and second surfaces being positioned so that the input light radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength; and
   a spacer element maintaining the relative positioning between the first and second surfaces to be constant, the spacer element having a thermal expansion coefficient with a magnitude of less than or equal to $10^{-5}/^\circ$ C.

18. An apparatus as in claim 17, wherein the spacer element is made of a material comprising glass.

19. An apparatus as in claim 17, wherein the spacer element has a thermal expansion coefficient with a magnitude of less than or equal to $10^{-6}/^\circ$ C.

20. An apparatus as in claim 17, wherein the first and second surfaces are parallel to each other, and the spacer element maintains the first and second surfaces to be in parallel through temperature changes.

21. An apparatus as in claim 17, wherein the first and second surfaces are separated by a specific distance, and the spacer element maintains the specific distance to be constant.

22. An apparatus as in claim 17, wherein the spacer element contacts the first and second surfaces.

23. An apparatus as in claim 17, further comprising:
   a plurality of spacer elements maintaining the relative positioning between the first and second surfaces to be constant.

24. An apparatus as in claim 17, further comprising:
   an adjusting element positioned between the first and second surfaces and being adjustable to change the optical distance between the first and second surfaces.

25. An apparatus as in claim 24, wherein the adjusting element is made of a transparent material.

26. An apparatus as in claim 24, wherein the adjusting element is made of transparent material and has first and second sides, the first side being adjacent to the first surface of the angular dispersive device and the second side being adjacent to the second surface of the angular dispersive device, the first and second sides of the adjusting element being coated with an anti-reflection coating.

27. An apparatus as in claim 26, wherein the adjusting element is a plate.

28. An apparatus as in claim 26, wherein the adjusting element is rotatable to change the optical distance.

29. An apparatus as in claim 24, wherein the adjusting element is rotatable to change the optical distance.

30. An apparatus as in claim 24, the apparatus having a top view and further comprising:
   a light returning device which receives the output light from the angular dispersive device and returns the output light to the angular dispersive device to be reflected between the first and second surfaces; and
   a lens positioned so that
      the output light travels from the angular dispersive device to the light returning device by travelling from the angular dispersive device to the lens and then being focused by the lens to the light returning device,
      the output light returns from the light returning device to the angular dispersive device by travelling from the light returning device to the lens and then being directed by the lens to the angular dispersive device, and
      the output light travelling from the angular dispersive device to the lens is perpendicular to the angular dispersive device in the top view, and the returned output light travelling from the lens to the angular dispersive device is perpendicular to the angular dispersive device in the top view.

31. An apparatus as in claim 17, wherein the first surface has a reflectivity of approximately 100%.

32. An apparatus as in claim 17, wherein the input light is a wavelength division multiplexed light comprising at least two carriers which each are at a different wavelength, and the plurality of transmitted lights interfere with each other to produce a respective output light for each carrier of the input light, each output light being spatially distinguishable from the other output lights.

33. An apparatus receiving an input light at a respective wavelength within a continuous range of wavelengths, the apparatus comprising:

an angular dispersive device having first and second surfaces, the second surface having a reflectivity which causes a portion of light incident thereon to be transmitted therethrough, the first and second surfaces being positioned so that the input light is reflected a plurality of times between the first and second surfaces to cause a plurality of lights to be transmitted through the second surface, the plurality of transmitted lights interfering with each other to produce an output light which is spatially distinguishable from an output light produced for an input light at any other wavelength within the continuous range of wavelengths; and a spacer element maintaining the relative positioning between the first and second surfaces to be constant, the spacer element being made of a material comprising glass and having a thermal expansion coefficient which is approximately zero.

34. An apparatus as in claim 33, wherein the spacer element has a thermal expansion coefficient with a magnitude which is less than or equal to $10^{-5}/°$ C.

35. An apparatus as in claim 33, wherein the spacer element has a thermal expansion coefficient with a magnitude which is less than or equal to $10^{-6}/°$ C.

36. An apparatus receiving an input light at a respective wavelength and focused into a line, the apparatus comprising:

an angular dispersive device including first and second surfaces, the second surface having a reflectivity which causes a portion of light incident thereon to be transmitted therethrough, the first and second surfaces being positioned so that the input light radiates from the line to be reflected a plurality of times between the first and second surfaces and thereby cause a plurality of lights to be transmitted through the second surface, the plurality of transmitted lights interfering with each other to produce an output light which is spatially distinguishable from an output light produced for an input light at a different wavelength; and a spacer element maintaining the relative positioning between the first and second surfaces to be constant, the spacer element being made of a material comprising glass and having a thermal expansion coefficient which is approximately zero.

37. An apparatus as in claim 36, wherein the spacer element has a thermal expansion coefficient with a magnitude of less than or equal to $10^{-5}/°$ C.

38. An apparatus as in claim 36, wherein the spacer element has a thermal expansion coefficient with a magnitude of less than or equal to $10^{-6}/°$ C.

* * * * *